United States Patent [19]

Wasson

[11] 3,723,443
[45] Mar. 27, 1973

[54] 4-(3-SUBSTITUTED AMINO)-2-HYDROXYPROPOXY)-1,2,5-THIADIAZOLES

[75] Inventor: Burton Kendall Wasson, Valois, Quebec, Canada

[73] Assignee: Charles E. Frosst & Co., Kirkland, Quebec, China /Taiwan

[22] Filed: Sept. 9, 1971

[21] Appl. No.: 179,147

Related U.S. Application Data

[60] Division of Ser. No. 818,090, April 21, 1969, Pat. No. 3,655,663, which is a continuation-in-part of Ser. No. 731,333, May 22, 1968, abandoned.

[52] U.S. Cl......260/293.68, 260/268 H, 260/293.63, 260/306.8 D, 260/999
[51] Int. Cl..............................................C07d 91/68
[58] Field of Search........260/268 H, 293.63, 293.68, 260/306.8 D

[56] References Cited

UNITED STATES PATENTS 3,488,360   1/1970   Weinstock et al.....................260/302

*Primary Examiner*—Henry R. Jiles
*Assistant Examiner*—G. Thomas Todd
*Attorney*—Erma R. Coutts et al.

[57] ABSTRACT

4-[3-(Substituted amino)-2-hydroxypropoxyl]-1,2,5-thiadiazole compounds, substituted by a nitrogen containing group in the 3-position of the thiadiazole nucleus which exhibit β-adrenergic blocking properties and thus are useful in the management of angina pectoris are described. The products are prepared by one of three principal methods (1) reaction of a 4-hydroxy-1,2,5-thiadiazole with epihalohydrin to provide 4-(3-halo-2-hydroxypropoxy)-1,2,5-thiadiazole which, upon treatment with alkali, forms the epoxide which is then reacted with an amine to provide the desired product; (2) reaction of a 3-chloro(or bromo)-4-(3-substituted amino-2-hydroxypropoxy)-1,2,5-thiadiazole with an amine or an N-containing heterocycle that replaces the 3-chloro group; and (3) reductive alkylation of an

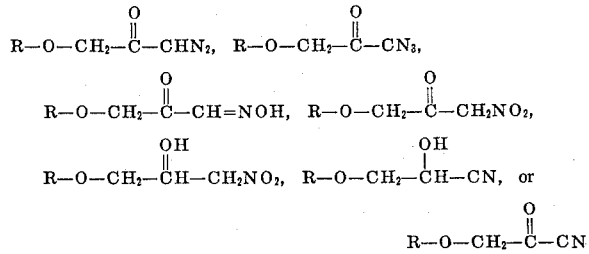

wherein R is the 1,2,5-thiadiazole-4-yl group.

8 Claims, No Drawings

4-(3-SUBSTITUTED AMINO)-2-HYDROXYPROPOXY)-1,2,5-THIADIAZOLES

This application is a division of my copending U.S. Pat. application, Ser. No. 818,090, filed Apr. 21, 1969 (now U.S. Pat. No. 3,655,663), which in turn was a continuation-in-part of U.S. Ser. No. 731,333, filed May 22, 1968 (now abandoned).

This invention is concerned with 4-[3-(substituted amino)-2-hydroxypropoxy]-1,2,5-thiadiazole compounds which are substituted in the 3-position of the thiadiazole nucleus by a nitrogen containing group. These compounds exhibit β-adrenergic blocking properties and have the marked advantages of having a long duration of action and being effective at very low dosage levels.

The novel β-adrenergic blocking agents of this invention have the structure

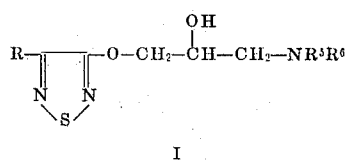

I and pharmacologically acceptable salts thereof, wherein R represents an amino having the structure — $NR^7R^8$ wherein $R^7$ represents hydrogen, lower alkyl having from one to four carbons and hydroxy substituted lower alkyl having from two to four carbons, $R^8$ represents hydrogen, a lower alkyl having from one to four carbon atoms, hydroxy substituted lower alkyl and phenyl, or $R^7$ and $R^8$ can be joined together directly to give a three- to 7-membered ring with the nitrogen to which they are attached thereby forming aziridinyl, azetidinyl, pyrrolidyl, piperidyl, or a hexahydroazepinyl group said 3- to 7-membered rings being either unsubstituted or substituted preferably with one or more lower alkyl having from 1 to 5 carbons, hydroxy or hydroxy-lower alkyl of $C_{1-3}$, substituents; $R^5$ represents hydrogen and lower alkyl having a straight or branched chain containing from one to five carbons; $R^6$ represents (1) a straight or branched chain alkyl having from one up to about 20 carbons but preferably a branched chain alkyl having from three to 10 carbons such as isopropyl, tert-butyl, 2,2-dimethylpropyl and the like, (2) an unsaturated straight or branched chain alkyl as the alkenyl or alkinyl groups having preferably from two to six carbons, such as allyl, butynyl, propargyl and the like, said straight or branched chained, saturated or unsaturated alkyl optionally being substituted with one or more groups preferably selected from (a) hydroxy, (b) di-lower alkyl ($C_{1-3}$) amino wherein the alkyl groups optionally can be joined together directly to form a heterocyclic group selected especially from pyrrolidinyl, piperazinyl, piperidinyl, each

group preferably being attached to an alkyl moiety having one to eight carbons, (c) phenyl or phenoxy optionally substituted with from one to three similar or dissimilar groups selected from alkoxy ($C_{1-3}$), alkyl ($C_{1-3}$), halogen (preferably chloro) or hydroxy, (3) $R^6$ also can represent a cycloalkyl group having from 3 to 6 nuclear carbons, optionally lower alkyl ($C_{1-3}$) substituted such as the cyclopropyl, cyclopentyl, cyclohexyl, 2-methylcyclohexyl and the like; and when $R^5$ and $R^6$ separately represent lower alkyl or lower alkenyl they additionally can be joined together directly to form a 4- to 6-membered ring with the nitrogen to which they are attached which heterocycles can optionally be substituted with a lower alkyl ($C_{1-3}$) to form, for example, the pyrrolidyl, piperidino, hexahydroazepinyl, $\Delta^3$- or $\Delta^2$-piperidienyl, 1,2-dihydropyridyl and the like.

Suitable pharmacologically acceptable salts of product I are acid addition salts derived from inorganic acids, for example, hydrochlorides, hydrobromides, phosphates or sulfates or salts derived from organic acids, for example, oxalates, lactates, malates, maleates, formates, acetates, succinates, tartrates, salicylates, citrates, phenylacetates, benzoates, p-toluenesulfonates and other salts such as those that provide relatively insoluble products that afford a slow release of the active material, for example, a 1,140 - methylene-bis(2-hydroxy-3-naphthoate) and the like.

The novel 4-[3-(substituted amino)-2-hydroxypropoxy]-1,2,5-thiadiazole compounds, structure I, as well as their intermediates which contain one asymmetric carbon atom in the propylene chain will be obtained as racemic compounds which can be separated into optically active isomers by known methods, for example, by forming a salt with an optically active acid, many of which are known to those skilled in the art, such as optically active tartaric, mandelic, cholic, 0,0-di-p-toluoyl tartaric, 0,0-dibenzoyl tartaric acids, or other acids conventionally employed for this purpose. Those novel products and intermediate compounds that contain two or more asymmetric carbons in the propylene chain will be obtained as diastereoisomers, and each diastereoisomer, of course, also will be obtained as a racemic compound which can be separated into its optically active isomers by known methods such as described above. Resolution of certain representative intermediate and end products will be described in the detailed examples. All products can be similarly resolved and the claims will be understood to embrace the products in the form of racemic compounds or diastereoisomers as well as in the form of the optically active isomers where appropriate.

The potential of a product as a β-adrenergic blocking agent conventionally is evaluated by the protocol which was employed to assess the β-blocking properties of the thiadiazole compounds of this invention. The protocol employed comprises intravenous administration of graded doses of the selected compound to rats which are then challenged with a standard dose of isoproterenol, a product known to be a β-stimulant. The $ED_{50}$ for representative products of this invention tested according to this protocol is included in certain of the examples that follow.

The clinical application of β-adrenergic blocking agents is well known to physicians. One use for the novel products of this invention, which constitutes the best mode for use of the products known to applicant at this time, is for the control of tachycardia that may be drug induced (as by isoproterenol) or brought about by physiological conditions. In view of the considerable amount of literature that has accumulated concerning the use of β-adrenergic blocking agents, physicians would employ the products of this invention in any of the known conditions where a short-acting or long-acting agent is needed, such as in the management of angina pectoris.

The products can be prepared in pharmaceutical formulations suitable for oral or parenteral administration preferably in the form of tablets, solutions, suspensions and emulsions. The 1,2,5-thiadiazoles can be formulated in the form of the free base or in the form of their salts in conjunction or admixture with organic and/or inorganic solid or liquid pharmaceutical excipients. No special problems are involved in preparing suitable formulations of these products and methods generally employed for this purpose, which are known to those skilled in this art, are entirely suitable. If desired the compounds can be administered along with or formulated together with other active ingredients. Dosage units of from about 2 mg. to 10 mg. can be provided for the symptomatic adjustment of dosage by the physician depending upon the age and condition of the patient.

The novel thiadiazole products I of this invention can be prepared by one or more of the following routes:

amines, particularly branched chain monoalkylamines, as neopentylamine, can be refluxed with the intermediate product C to give the desired product I directly.

Product I can be prepared by the reaction of starting substance A with an α-haloalkanoic acid of the structure $$halo-CH_2-CO_2H$$

to provide 3-R-4-α-carboxyalkoxy-1,2,5-thiadiazole which is converted by conventional methods to the acid chloride. Reaction of the acid chloride with diazomethane gives the 3-R-4-(3-chloro-2-oxopropoxy)-1,2,5-thiadiazole which upon reduction, preferably with sodium borohydride, affords the intermediate C, which is converted to the thiadiazole I by the procedures described above.

Many of the thiadiazole starting materials, A, are known compounds or can be made from known starting materials. In general, the process for making the thiadiazoles A comprises the reaction of an R—ClCH—CONH$_2$ with ammonium hydroxide to provide the corresponding α-R-α-amino-acetamide hydrochloride which product, when reacted with SCl$_2$, S$_2$Cl$_2$, SOCl$_2$ or thionylaniline, provides the desired

ROUTE I

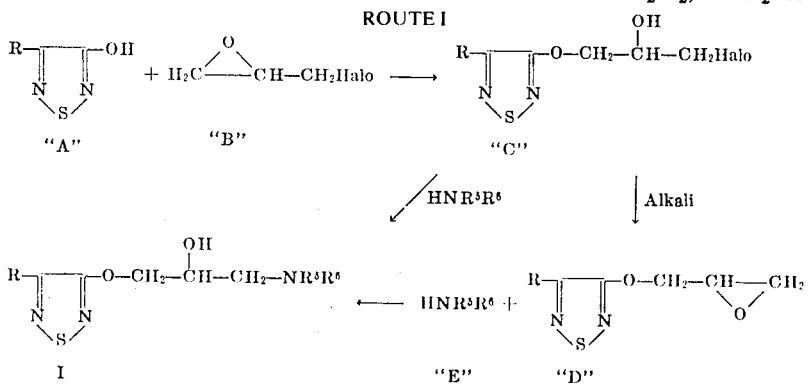

The 3-R-4-hydroxy-1,2,5-thiadiazole (A) is treated with epichlorhydrin or epibromhydrin (B) to provide product C which can be separated from the reaction mixture by extraction with ether. Ideally, the epihalohydrin is used in excess for its solvent properties and the reaction proceeds at room temperature or with heating up to about 90° C. with optimum results being obtained by heating at a temperature between about 55°–70 C. The reaction of A and B is additionally facilitated by the presence of a trace of base which serves as a catalyst, preferred catalysts being piperidine, piperidine hydrochloride, pyridine or other heterocyclic bases. After extraction the intermediate product C is shaken with aqueous alkali to afford the epoxide (D). Aqueous sodium or potassium hydroxide are preferred at a concentration of about 20 percent for best yields. Treatment of the epoxide D with the amine E provides the desired thiadiazole product I. Advantageously an excess of the amine is employed for its solvent properties; from 3 to 5 moles of the amine being adequate to give very good yields of the desired product. Larger quantities of course can be employed if so desired. This step can be carried out at a temperature between about ambient temperature and 90° C. although it is preferred to use temperatures between about 60°–70° C. It has also been found that certain thiadiazole A. It is sometimes more convenient to prepare the α-amino-acetamide product from an α-amino acid such as an R—CH(NH$_2$)—CO$_2$H by treatment with acetyl chloride in methanol to form the ester which upon treatment with a large excess of ammonium hydroxide forms the desired α-amino-acetamide which then can be treated with SCl$_2$, S$_2$Cl$_2$, SOCl$_2$ or thionylaniline to provide the thiadiazole A.

Another route by which novel compounds of this invention can be prepared can be illustrated as follows:

ROUTE II

In the second route, treatment of the thiadiazole, I-d, (prepared by the method described in Route I) with an amine, F, affords the appropriately 3-substituted product I-e. When the amine F is a primary or secondary amine, the reaction advantageously is carried out under pressure; however, when the amine is a heterocycle of the type defined hereinabove the reaction readily takes place without pressure by heating the reactants at a temperature between about 100°–150° C. but preferably at a temperature between about 125°–135° C. A slight excess of the amine F generally is used for its solvent properties and from about 3 to 5 moles of amine have been found to give optimum yields. Larger quantities can, of course be employed, if desired.

Various modifications can be made in the above preferred methods for preparing the products of this invention. For example, when starting material A in Route I is the 3-chloro(or bromo)-4-hydroxy-1,2,5-thiadiazole, it can be reacted with product F (see Route II) thereby introducing the desired —NR⁷R⁸ group in the 3-position of the thiadiazole nucleus. Also, when R in product D (see Route I) is chloro or bromo, product D can be reacted with the amine F whereupon the amine will first react with the epoxide portion of the product and then, by increasing the temperature, it will replace the chloro or bromo group thereby forming a product of the structure:

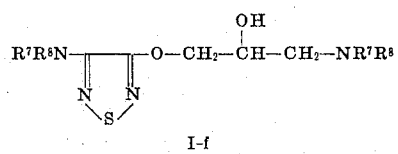

I-f

Obviously an amine of the structure HNR⁵R⁶ could be used in place of reactant F. As is usual, the amine is employed in excess for its solvent properties and the second state of the reaction advantageously is carried out at a temperature from between about 110°–150° C. although preferably at between about 125°–135° C. to introduce the amino group into the 3-position. In some instances it may be advantageous to carry out this reaction in a sealed vessel.

A third route for preparing the novel products of this invention comprises forming the substituted amino group in situ by reductive alkylation illustrated by the following scheme:

Y is preferably a saturated or unsaturated lower alkyl ($C_{1-5}$), hydroxy-lower alkyl ($C_{2-5}$), lower cycloalkyl ($C_{3-6}$) or phenyl;

Z is lower alkyl ($C_{1-5}$), and when

Y and Z are each lower alkyl they can be linked together to form a 3- to 6-membered carbocyclic ring with the carbon to which they are attached;

R and R⁶ have the meaning hereinbefore assigned.

As catalyst, palladium on charcoal or lithium aluminum hydride as reducing agent, advantageously is employed.

The following examples will illustrate representative products of this invention prepared by the above described procedures. It will be understood that these compounds can be prepared by either Route I, II or III or a combination or modification of these routes as described above. The following examples therefore are not to be considered as limiting the preparation of any particular compound to the method described in the example as the examples are provided solely to illustrate the best modes currently known to applicant for the preparation of the novel thiadiazoles of this invention.

EXAMPLE 1

3-Piperidino-4-(3-isopropylamino-2-hydroxypropoxy)-1,2,5-thiadiazole Hydrochloride Step A: Preparation of 3-chloro-4-(2,3-epoxypropoxy)-1,2,5-thiadiazole A mixture of 30 g. (0.22 moles) of 3-chloro-4-hydroxy-1,2,5-thiadiazole, 71 g. (0.77 moles) of epichlorohydrin, and 0.6 ml. of piperidine is maintained at 65°–70° C. for 2 hours. Excess epichlorohydrin is removed at about 95° C. using water-pump vacuum. The residual viscous gum, 55.5 g., is dissolved in diethyl ether and refrigerated. The supernatant ethereal liquor is drawn off and evaporated to dryness giving 20.2 g. of a viscous oil that is then stirred for about one-half hour with 150 ml. of 10 percent sodium hydroxide solution. The mixture warms up slightly during this treatment. The mixture then is extracted with diethyl ether, washed with water, and evaporated to yield 20.2 g. of crude 3-chloro-4-(2,3-epoxypropoxy)-1,2,5-thiadiazole.

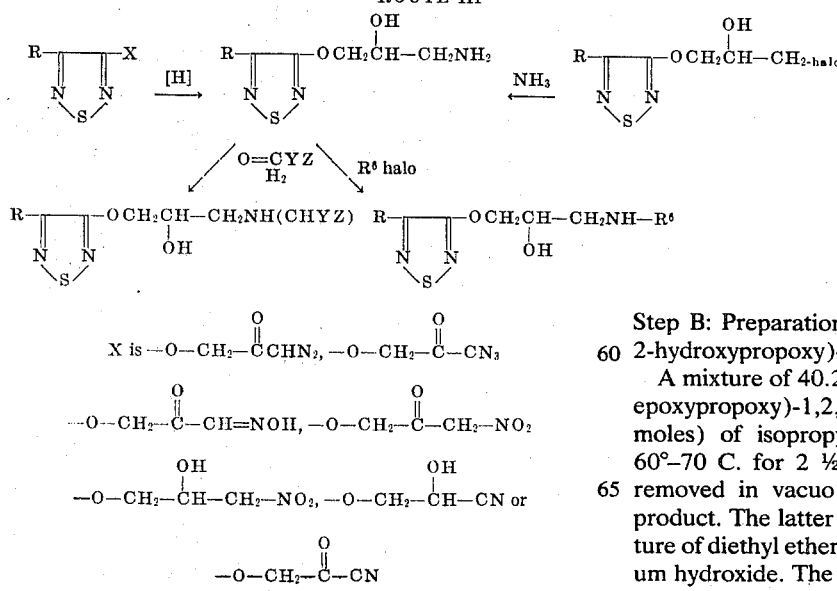

Step B: Preparation of 3-chloro-4-(3-isopropylamino-2-hydroxypropoxy)-1,2,5-thiadiazole hydrochloride A mixture of 40.2 g. (0.21 mole) of 3-chloro-4-(2,3-epoxypropoxy)-1,2,5-thiadiazole and 76 g. (1.05 moles) of isopropylamine is heated and stirred at 60°–70 C. for 2 ½ hours. Excess isopropylamine is removed in vacuo giving 42.4 g. of residual crude product. The latter is dissolved by shaking with a mixture of diethyl ether and water containing 2.5 g. of sodium hydroxide. The ethereal phase is separated and the aqueous phase is extracted with several portions of diethyl ether. The ethereal extracts are combined, washed with small volumes of water and then treated with excess 3N hydrochloric acid. The aqueous layer is separated, evaporated to dryness, and the resulting residue is dried by azeotropic distillation of benzene ethanol. The crystalline solid is recrystallized from ethanol diethyl ether giving 3-chloro-4-(3-isopropylamino-2-hydroxypropoxy)-1,2,5-thiadiazole hydrochloride.

Step C: Preparation of 3-chloro-4-(3-isopropylamino-2-hydroxypropoxy)-1,2,5-thiadiazole The 3-chloro-4-(3-isopropylamino-2-hydroxypropoxy)-1,2,5-thiadiazole hydrochloride obtained in Step B is neutralized with aqueous sodium carbonate and the free base extracted with diethyl ether. After removal of the solvent, the residue is recrystallized from diisopropyl ether giving the free base.

Step D: Preparation of 3-piperidino-4-(3-isopropylamino-2-hydroxypropoxy)-1,2,5-thiadiazole hydrochloride A mixture of 11.8 g. (39 millimoles) of 3-chloro-4-(3-isopropylamino-2-hydroxypropoxy)-1,2,5-thiadiazole hydrochloride from Step B, and 65.5 ml. (752 millimoles) of piperidine is heated and stirred at 125°–135° C. for 4 hours. This mixture is refrigerated overnight and the precipitated product is collected and dried. The excess piperidine is removed by distillation in vacuo, the residue is shaken with 10 ml. of water containing 1.6 g. of sodium hydroxide and extracted with diethyl ether. The combined ethereal extracts are washed sparingly with water and evaporated to dryness. The product is dissolved in anhydrous diethyl ether and treated with excess hydrogen chloride in diethyl ether to give a solid product which following recrystallization from anhydrous acetone-diethyl ether gives 3-piperidino-4-(3-isopropylamino-2-hydroxypropoxy)-1,2,5-thiadiazole hydrochloride, m.p. 169°–170.5° C. ($ED_{50} = 0.13$ mg/kg).

Analysis calculated for $C_{13}H_{25}ClN_4O_2S$:
C, 46.35; H, 7.48; Cl, 10.52; N, 16.63; S, 9.52;
Found: C, 46.71; H, 7.32; Cl, 10.58; N, 16.40; S, 9.42.

Additional products of this invention that advantageously are prepared by the procedure described in Example 1 are identified in Table I, below. These products are synthesized by following the procedure identified in Example 1 but replacing the 3-chloro-4-(3-isopropylamino-2-hydroxypropoxy)-1,2,5-thiadiazole hydrochloride by the reactant I-$d$ having the $R^6$ substituent identified in the Table and replacing the piperidine employed in Example 1 by the amine reactant F having the substituents identified for this reactant in the following Table under the headings $R^7$ and $R^8$. The $R^6$, $R^7$ and $R^8$ groups identified for the starting materials F and I-$d$ are retained in the end product I-$a$ for which physical properties are provided.

Additional products of this invention that are prepared by the procedures described in Routes I, II or III and more particularly illustrated by Example 1 are identified in the following Table. The compounds identified in Table II wherein R is a group having the

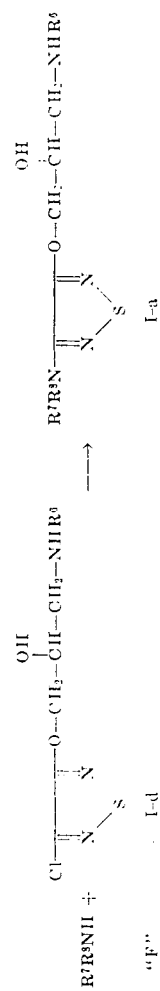

TABLE I

| Example number | $R^7$ | $R^8$ | $R^6$ | Empirical formula | M.P. in °C. | Analysis Calculated | | | | | Analysis Found | | | | | $ED_{50}$, mg./kg. |
|---|---|---|---|---|---|---|---|---|---|---|---|---|---|---|---|---|
| | | | | | | C | H | Cl | N | S | C | H | Cl | N | S | |
| 2 | —(CH$_2$)$_5$— | | (CH$_3$)$_3$C— | C$_{14}$H$_{26}$N$_4$O$_2$S·HCl | 171-2 | 47.92 | 7.76 | 10.10 | 15.97 | 9.14 | 48.06 | 8.21 | 10.20 | 16.04 | 9.40 | 0.08 |
| 3 | —(CH$_2$)$_2$—CH—(CH$_2$)$_2$— | | (CH$_3$)$_3$C— | C$_{14}$H$_{26}$N$_4$O$_3$S·C$_2$H$_4$O$_4$ | 171-3 | 48.42 | 6.77 | ..... | 12.55 | 7.18 | 49.33 | 6.83 | ..... | 12.34 | 7.21 | 0.033 |
| | |OH | | | | | | | | | | | | | | | structure $R^7R^8N-$ are advantageously prepared from the compound

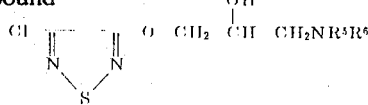

synthesized by the process substantially as described in Example 1, Steps A and B, and then replacing the 3-chloro by the $R^7R^8N-$ group by reaction with the selected amine by substantially the same procedure described in Example 1, Step D.

TABLE II $$R-\underset{\underset{S}{N\diagdown\diagup N}}{\overset{}{\boxed{\phantom{xx}}}}-O-CH_2-\overset{OH}{\underset{|}{CH}}-CH_2-NR^5R^6$$

| R | R⁵ | R⁶ |
|---|---|---|
| ⬡H N— | H | $C_{10}H_{21}$ |
| HO—⬡H N— | H | $-CH(CH_3)-C_5H_{11}$ |
| ⬡H N— | H | —▷H |
| Same as above | H | $-CH(CH_3)-CH_2-O-$⬡$-OC_2H_5$ |
| HO—⬡H N— | H | $-(CH_2)_2-O-$⬡$-CH_3$ |
| Same as above | H | $-C(CH_2OH)_2-C_2H_5$ |
| ⬠H N— | H | $-(CH_2)_2-$⬡$(OCH_3)(OCH_3)$ |
| ⬣H N— | H | $-CH(CH_3)-CH(CH_3)-CH_2-$⬡$-Cl$ |
| Same as above | H | $-(CH_2)_3-N(CH_3)_2$ |
| HO—⬡H N— | H | $-(CH_2)_2-N(C_2H_5)_2$ |
| ⬡H N— | $-CH(CH_3)_2$ | $-CH_2-C_6H_5$ |
| HO—⬡H N— | $-C_2H_5$ | $-C_2H_5$ |
| ⬡H N— | ⌐————————$(CH_2)_5$————————⌐ ||
| ⬠H N— | ⌐————————$(CH_2)_4$————————⌐ ||
| HO—⬡H N— | ⌐————$CH_2-CH=CH-(CH_2)_2$————⌐ ||
| ⬠H N— | ⌐————————$-CH=CH-(CH_2)_3$————⌐ ||
| $C_4H_9NH-$ | H | $-C(CH_3)_3$ |
| $(C_2H_5)_2N-$ | H | $-C(CH_3)_3$ |
| $[(CH_3)_2CH]_2N-$ | H | $-C(CH_3)_3$ |
| $(HO-CH_2CH_2)_2N-$ | H | $-C(CH_3)_3$ |
| ⬡(CH₃)H N— | H | $-C(CH_3)_3$ |
| $CH_3-$⬡H N— | H | $-CH(CH_3)_2$ |
| ⬡(C₂H₅)H N— | H | $-C(CH_3)_3$ |
| ⬡(CH₂CH₂OH)H N— | H | $-C(CH_3)_3$ |

Preparation of the novel products of this invention from the 3-R-4-(3-amino-2-hydroxypropoxy)-1,2,5-thiadiazole is described in the following example.

EXAMPLE 4

3-Piperidino-4-(3-α-methylbenzylamino-2-hydroxypropoxy)-1,2,5-thiadiazole

3-Chloro-4-hydroxy-1,2,5-thiadiazole is treated with 2-chloroacetic acid in the presence of ethanolic sodium hydroxide to give 3-chloro-4-carboxymethoxy-1,2,5-thiadiazole. Treatment of this acid with thionyl chloride or oxalyl chloride affords the acid chloride, 3-chloro-4-chlorocarbonylmethoxy-1,2,5-thiadiazole. This compound is treated with potassium cyanide by the usual method to give the cyanoketone, 3-chloro-4-cyanocarbonylmethoxy-1,2,5-thiadiazole which is hydrogenated in the presence of a catalyst such as palladium on charcoal or reduced with lithium aluminum hydride to give 3-chloro-4-(3-amino-2-hydroxypropoxy)-1,2,5-thiadiazole. This amine, when reductively alkylated with acetophenone affords 3-chloro-4-(3-α-methylbenzylamino-2-hydroxypropoxy)-1,2,5-thiadiazole, which when reacted with piperidine by the process of Example 1, Step D, gives 3-piperidino-4-(3-α-methylbenzylamino-2-hydroxypropoxy)-1,2,5-thiadiazole.

By replacing the cyanoketone and the acetophenone reactants employed in Example 4 by other 3-chloro-4-X-1,2,5-thiadiazoles and other O=CYZ ketones of the type identified for Route III, other 3-R-4-{3-[(CHYZ)NH]-2-hydroxypropoxy}-1,2,5-thiadiazole compounds are obtained wherein the groupings R, X, Y and Z have the meaning assigned hereinabove in relation to Route III.

The invention further provides pharmaceutical compositions comprising, as active ingredient, at least one of the compounds according to the invention in association with a pharmaceutical carrier or excipient. The compounds may be presented in a form suitable for oral, rectal or parenteral administration. Thus, for example, compositions for oral administration may be solid or liquid and may take the form of capsules, tablets, coated tablets, suspensions, etc., such compositions comprising carriers or excipients conveniently used in the pharmaceutical art. Thus suitable tabletting excipients include lactose, potato and maize starches, talc, gelatine, stearic acid, magnesium stearate, polyvinyl pyrrolidone, or other known tabletting substances.

For parenteral administration, the carrier or excipient may be a sterile, parenterally acceptable liquid, e.g., pyrogen-free water or an aqueous solution of polyvinyl pyrrolidone, or a parenterally acceptable oil, e.g., arachis oil, contained in ampoules.

In compositions for rectal administration, the carrier may comprise a suppository base, e.g., cocoa butter or a glyceride.

Advantageously, the compositions may be formulated as dosage units, each unit being adapted to supply a fixed dose of active ingredient. Tablets, coated tablets, capsules, ampoules and suppositories are examples of preferred dosage unit forms according to the invention. Each dosage unit adapted for oral administration may conveniently contain 1 to 20 mg., and preferably 2 to 10 mg., of the active ingredient; each dosage unit adapted for parenteral administration may conveniently contain 0.1 to 5 mg., and preferably 0.1 to 1 mg., of the active ingredient.

What is claimed is:

1. A 1,2,5-thiadiazole having the structure

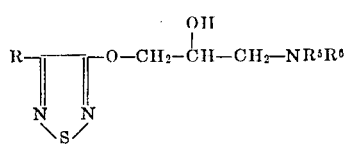

and pharmacologically acceptable salts thereof wherein

R is a nitrogen-containing group of the structure — $NR^7R^8$ wherein

R[7] is selected from hydrogen, lower alkyl and hydroxy substituted lower alkyl, R[8] is selected from hydrogen, lower alkyl and hydroxy substituted lower alkyl, or R[7] and R[8] when lower alkyl can be linked directly together to form a 3- to 7-membered ring with the nitrogen to which they are attached or a substituted 3- to 7-membered ring wherein the substituent groups are selected from lower alkyl, hydroxy, or hydroxy-lower alkyl;

R[5] is selected from the group consisting of hydrogen and lower alkyl;

R[6] is selected from the group consisting of
1. $C_{1-10}$ alkyl,
2. substituted $C_{1-10}$ alkyl wherein the substituent groups are selected from (a) hydroxy, (b) di-lower alkylamino, (c) pyrrolidinyl, (d) piperazinyl, (e) piperidinyl, (f) phenyl, (g) halophenyl, (h) lower alkoxyphenyl, (i) phenoxy, (j) lower alkoxyphenoxy, (k) lower alkylphenoxy, and
3. $C_{3-6}$ cycloalkyl; and R[5] and R[6] can be joined together to form with the nitrogen atom to which they are attached the pyrrolidyl, piperidino, hexahydroazepinyl.

2. A 1,2,5-thiadiazole as claimed in claim 1 wherein R is piperidino of the structure

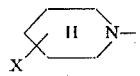

wherein X is selected from the group consisting of hydrogen, hydroxy, lower alkyl and hydroxy-lower alkyl.

3. A 1,2,5-thiadiazole having the structure

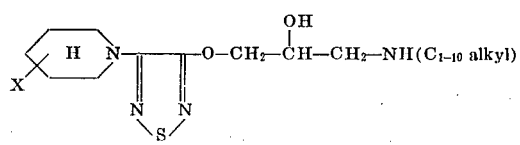

or a pharmacologically acceptable salt thereof wherein X is selected from the group consisting of hydrogen, hydroxy, lower alkyl and hydroxy-lower alkyl.

4. A 1,2,5-thiadiazole having the structure

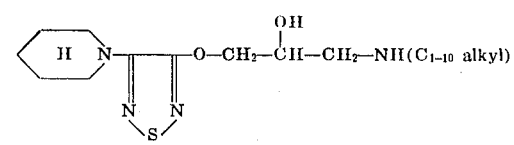

or a pharmacologically acceptable salt thereof.

5. A 1,2,5-thiadiazole as claimed in claim 4 wherein the ($C_{1-10}$ alkyl) is tert-butyl.

6. A 1,2,5-thiadiazole as claimed in claim 4 wherein the ($C_{1-10}$ alkyl) is isopropyl.

7. A 1,2,5-thiadiazole having the structure

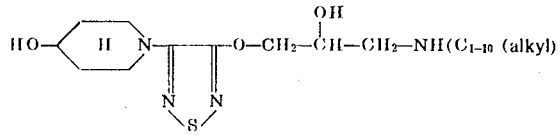

or a pharmacologically acceptable salt thereof.

8. A 1,2,5-thiadiazole as claimed in claim 7 wherein the ($C_{1-10}$ alkyl) is tert-butyl.

* * * * *